(12) United States Patent
Maker et al.

(10) Patent No.: US 6,412,271 B1
(45) Date of Patent: Jul. 2, 2002

(54) FUEL CONTROL SYSTEM

(75) Inventors: Paul Manwaring Maker, Wrentham, MA (US); Trevor Stanley Smith, Birmingham (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/561,124

(22) Filed: Apr. 28, 2000

(30) Foreign Application Priority Data

Apr. 30, 1999 (GB) ............................................... 9910074

(51) Int. Cl.[7] ................................. F02C 7/06; F02C 7/22
(52) U.S. Cl. ....................... 60/39.08; 60/39.281; 60/734
(58) Field of Search ........................... 60/39.08, 39.281, 60/734; 251/325

(56) References Cited

U.S. PATENT DOCUMENTS

| | | | | |
|---|---|---|---|---|
| 2,784,551 A | * | 3/1957 | Karkby et al. | 60/39.08 |
| 5,715,674 A | * | 2/1998 | Reuter et al. | 60/39.281 |
| 5,806,300 A | * | 9/1998 | Vielleux et al. | 60/39.281 |

* cited by examiner

*Primary Examiner*—Louis J. Casaregola
(74) *Attorney, Agent, or Firm*—Andrus, Sceales, Starke & Sawall

(57) ABSTRACT

A fuel control system for an engine, having a pump operable to supply an output flow of fuel, engine fuel flow regulation means operable to regulate the pump output flow, and pump control means operable to vary an output rate of the pump according to an operational condition of the engine fuel flow regulation means.

3 Claims, 3 Drawing Sheets

FUEL CONTROL SYSTEM

This invention relates to a fuel control system and a valve therefor. More particularly, but not exclusively, the invention relates to such a system and valve for use with a gas turbine engine for aerospace applications. The fuel supply system for a gas turbine engine generally comprises a high-pressure fuel pump and series metering valve. In order to provide consistent, accurate, metering of fuel, a spill valve is provided to maintain a substantially constant pressure drop across the metering valve. Where the output flow rate from the pump significantly exceeds the metered flow requirement, a large volume of fuel is returned by the spill valve to the pump islet. This high recirculated volume results in undesirable heat rejection into the fuel.

In accordance with the invention, a fuel control system for an engine comprises a pump operable to supply an output flow of fuel, engine fuel flow regulation means operable to regulate the pump output flow, and pump control means operable to vary an output rate of the pump according to an operational condition of the engine fuel flow regulation means.

Conveniently, the engine fuel flow regulation means comprises a metering valve, and the pump control means is operable to vary the output rate of the pump according to the operational condition of the metering valve.

A fuel control system for an engine comprising a pump operable to supply an output flow of fuel, a metering valve operable to regulate the output flow, and auxiliary flow control means operable to vary an auxiliary flow of fuel from the output flow according to an operational condition of the metering valve.

Additionally, a pressure drop and spill valve may be connected across the metering valve. This facilitates accurate and rapidly responsive control of the regulated flow, which complements the relatively slow control of the output flow provided by the pump control means.

Preferably, the pump control means comprises a servo device for varying the output rate of the pump in response to a servo flow, and a servo flow port arrangement integral with the metering valve for controlling the servo flow to the servo device. Appropriate pump control can be provided in this manner without the need for a discrete servo valve arrangement, facilitating a reduction of the volume and weight of the fuel control system.

Conveniently, the pump control means is operable such that the pump output rate is increased to a predetermined maximum when a low pressure servo flow is supplied to the servo device and decreased to a predetermined minimum when a high pressure servo flow is supplied to the servo device. This alleviates the potential problem of a depiction of the output flow to the engine by a high-pressure servo flow when the engine requires maximum available regulated flow.

The engine fuel flow regulation means may comprise a pressure drop and spill valve operable to regulate a pressure drop across a metering valve by spilling fuel, tie control means being operable to vary the output rate of the pump according to the operational condition of the pressure drop and spill valve.

The pressure drop and spill valve facilitates accurate and rapid fine tuning of the system parameters whilst the pump control means facilitates the provision of slightly slower, more approximate continuous output flow adjustments to reduce spill volume, with a view to achieving near optimum pump delivery and heat rejection across a wide range of operating conditions.

Preferably, the pump control means comprises a servo device for varying the output rate of the pump in response to a servo flow, and a servo flow port arrangement integral with the pressure drop and spill valve for controlling the servo flow to the device. Appropriate pump control can be provided in this manner without the need for a separate servo valve and/or servo position sensor arrangement, facilitating a reduction in the volume and weight of the fuel control system.

In another aspect, the invention provides a metering valve for a fuel control system or a pressure drop and spill valve for a fuel control system, the valve including an auxiliary flow port arrangement for varying an auxiliary flow from the valve to a bearing surface of a fuel pump of the system and/or a servo flow port arrangement for controlling a servo flow from the valve to a fuel pump control servo device.

According to a further aspect of the invention, there is provided a fuel control system for an engine, comprising. a pump operable to supply an output flow of fuel, a valve operable to regulate the output flow, and auxiliary flow control means operable to vary an auxiliary flow of fuel from the output flow according to an operational condition of the valve. This permits reduction of the auxiliary flow to minimise depletion of the output flow and maximise the regulated flow available to the engine.

The auxiliary flow control means may include an auxiliary flow port arrangement integral with the valve, for varying the auxiliary flow. This removes the need for a separate auxiliary flow control valve and/or sensor, facilitating a reduction in the volume and weight of the fuel control system. The term "engine fuel flow regulation means" as used herein refers to any means suitable for regulating pump output flow, for example a metering valve and/or pressure drop and spill valve.

In order that the invention may be well understood, three embodiments of the invention will now be described, by way of example only. with reference to the accompanying drawings, in which.

Figure 1:
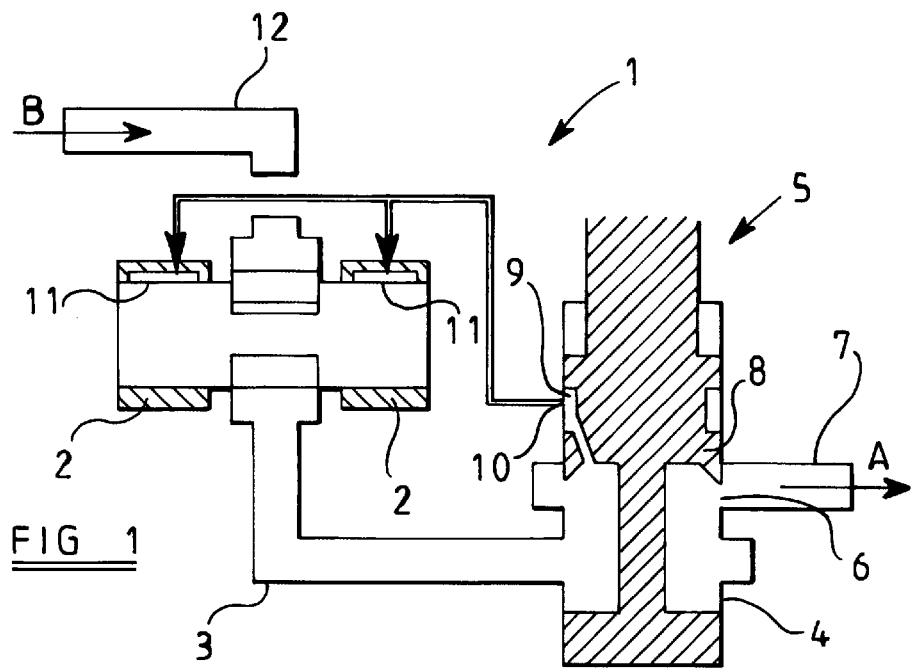
FIG. 1 is a schematic drawing showing a portion of a fuel control system for a gas turbine engine.

Referring to FIG. 1, a fuel control system 1 includes a variable displacement vane pump (shown in cross-section) mounted using bearings 2, two of which are shown. The pump is operable to supply an output flow of fuel through a passageway 3 to a flow regulation chamber 4 of an output flow-regulating valve 5, commonly referred to as a metering valve The metering valve 5 is operable to regulate the flow of fuel passing through the chamber 4 through an orifice 6, to supply a desired regulated flow of fuel along a passageway 7 in the direction of arrow A to a gas turbine engine (not shown) in accordance with the operating requirements of the engine. Flow of fuel through the orifice 6 is controlled by movement of a metering valve member 8 relative to the orifice 6 to vary the effective size of the orifice 6. A pressure drop and spill valve (not shown) would normally be connected across the metering valve 5 to maintain a desired pressure across the metering valve 5 in a known manner.

The metering valve 5 also has an auxiliary flow chamber 9 in fluid communication with the flow regulation chamber 4. in FIG. 1, the chamber 9 is shown in fluid communication with an auxiliary flow orifice 10 through which fuel is supplied to inner surfaces 11 of the bearings 2, for lubricating the surfaces 11.

In use, low-pressure fuel is fed into the vane pump along a passageway 12 in the direction of arrow B. The fuel is discharged from the vane pump into the passageway 3 at high pressure. In this description, the terms low pressure and high pressure are to be understood to relate respectively to the pressure of fuel prior to entering the vane pump and the pressure of fuel on the discharge side of the vane pump.

In its position shown in FIG. 1, the valve member 8 provides an intermediate level of regulated flow through the orifice 6 and a lubricating flow of high pressure fuel is supplied to the bearing surfaces 11 through the orifice 10. Such an intermediate flow would be usual, for example, during engine cruise and idle conditions, which in the exemplary system demand a regulated flow above 600 pph.

During periods of increased engine flow requirement, for example under takeoff and climb conditions, the valve member 8 is moved relative to the orifice 6 axially upwardly in the orientation shown in FIG. 1, and it will be appreciated that the orifice 10 remains in communication with chamber 9 to thereby continue the high pressure fuel supply to the bearing surfaces 11.

During periods of low engine flow requirement, for example for low engine speeds under relight and windmill conditions, which in the exemplary system demand a regulated flow below 430 pph, the valve member 8 is moved axially downwardly in the orientation shown in FIG. 1 so as to reduce the effective area of the orifice 6. The orifice 10 will then no longer be in fluid communication with the chamber 9, so that the high-pressure fuel supply to the bearing surfaces 11 is interrupted. The low engine speed results in a low pump speed, and a consequent relatively low rate of output flow through the passageway 3. Cutting off the lubricating fuel supply to the bearing surfaces 11, through which there may be a flow rate of about 1070 pph at 90 psid, prevents unnecessary depletion of the output flow, thereby ensuring an adequate regulated flow to the engine. Relight can be effected at 4.8% speed using the system 1. Because of the low pressure rise across the pump and low pump speed, cutting off the lubricating flow to the bearing surfaces 11 does not have any damaging effect on the bearing surfaces under these conditions.

The auxiliary flow port arrangement incorporating orifice 10 and chamber 9 is provided by the metering valve 5, removing the need for a separate auxiliary flow control valve and sensor which would be required to confirm that the flow control valve is operating correctly. The control of auxiliary flow to the bearing surfaces 11 is particularly reliable because of the inherent reliability of the metering valve 5 of which the auxiliary flow port arrangement 9,10 forms a part.

Figure 2:
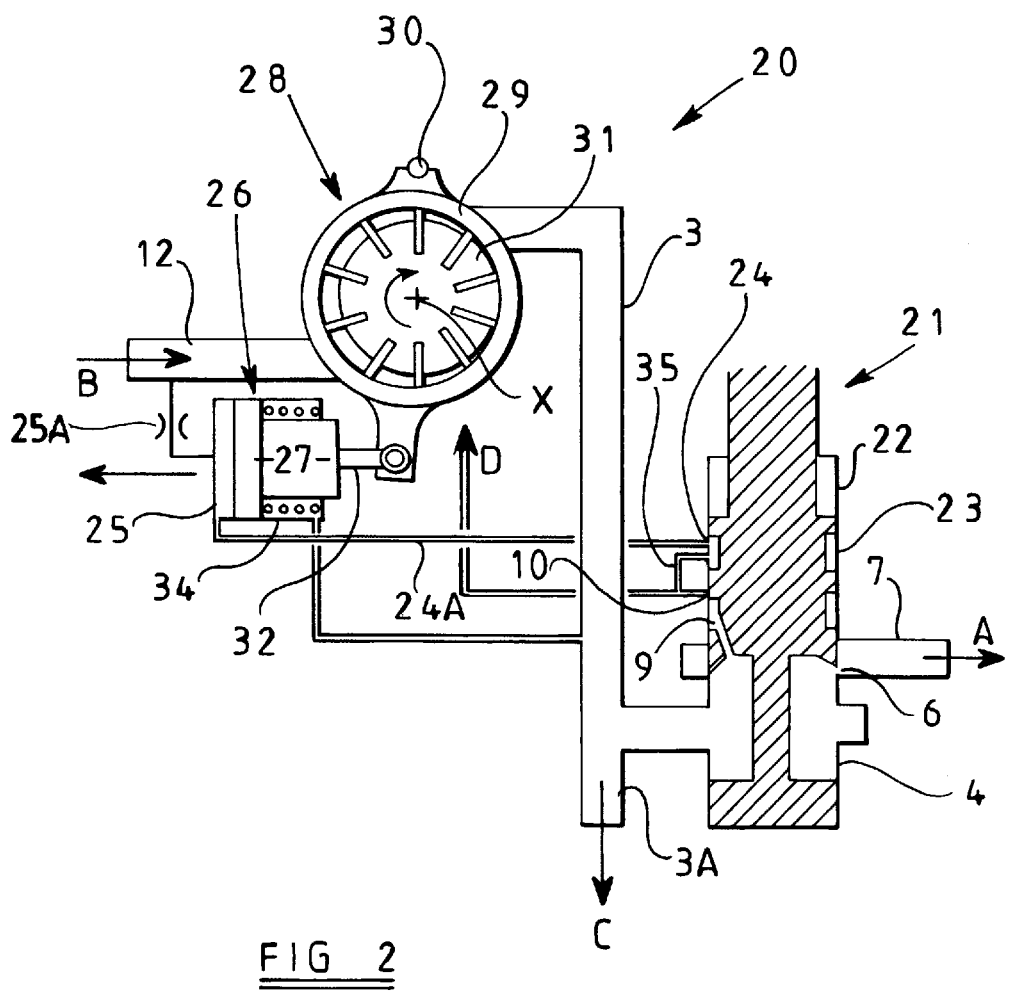
FIG. 2 is a schematic drawing showing a portion of another fuel control system for a gas turbine engine.
Figure 3:
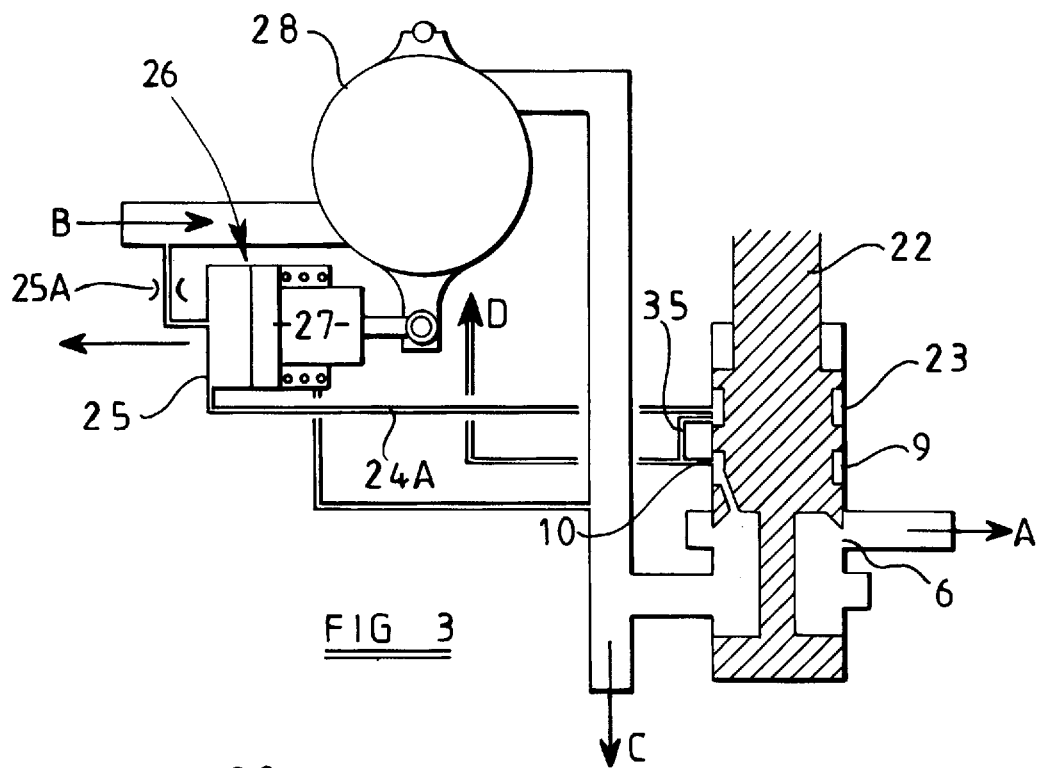
FIG. 3 is a view similar to FIG. 2 showing the system in a different operation condition thereof.
Figure 4:
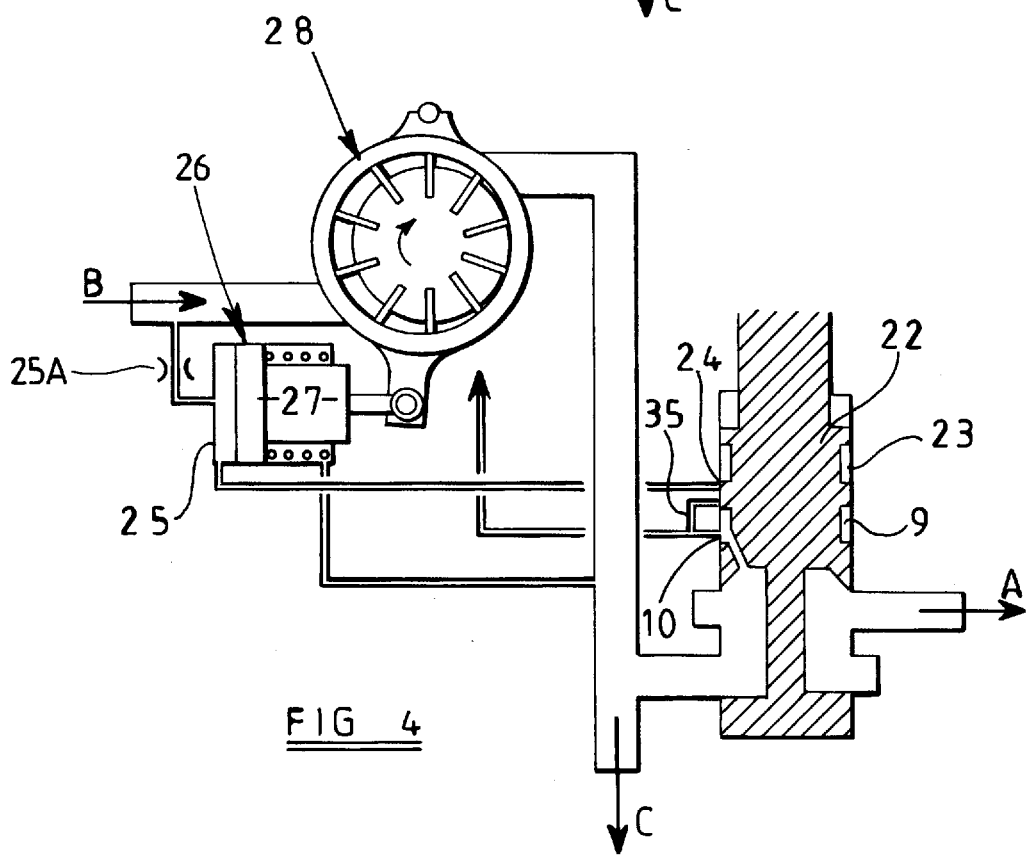
FIG. 4 is a view similar to FIG. 2 showing the system in still another operating condition thereof.

FIG. 2 relates to another fuel control system 20 having a metering valve 21 operable to regulate the flow of fuel to supply a desired regulated flow of fuel to an engine (not shown) in the direction of arrow A. The valve 21 incorporates an auxiliary flow port arrangement similar to that described in relation to FIG. 1. FIGS. 3 and 4 relate to the system shown in FIG. 2, and show the metering valve in various alternative operating positions. Features of the system 20 that are similar to features already described with reference to FIG. 1, are given the same reference numerals as in FIG. 1 and to avoid repetition will not be described again in detail.

The metering valve 21 has a valve member 22 and defines a servo flow chamber 23 and a servo flow orifice 24.

The orifice 24 is in fluid communication via a path 24A with a piston control chamber 25 of a servo device 26 having a piston 27. The system 20 incorporates a variable delivery vane pump 28. The delivery capacity of the pump 28 is variable by moving a pump housing 29 about a hinge 30 relative to a pump rotor 31, so that the control axis of the housing 29 can be offset by a variable amount from the rotational axis X of the rotor. A connecting rod 32 connects the piston 27 to the housing 29 at the side of the latter opposite to the hinge 30, to enable the capacity of the pump 28 to be varied by axially moving the piston 27.

The position of the valve member 22 in FIG. 2 provides a low regulated flow in the direction of arrow A. In this operational condition, the low speed of the engine results in a low pump speed and a resultant requirement for a high pump discharge rate relative to the pump speed to provide sufficient regulated flow. It will be apparent that valve member 22 closes orifice 10, cutting off auxiliary lubricating flow to the rotor bearing surfaces (not shown) and thereby alleviating unnecessary depletion of the output flow as described. in relation to FIG. 1. Closure of orifice 10 also cuts off high pressure supply to chambers 23 and 25 via orifice 25A enabling a biasing spring 34 of the servo device 26, assisted by a high pressure flow applied to the right hand side of the piston 27, to drive the piston 27 to the left in the orientation shown in FIG. 2 and move the pump housing 29 into the maximum discharge position of the pump. High flow is thus delivered via the passageway 3, with any excess spilt alone passage 3A in the direction of arrow C to low pressure under the control of a pressure drop and spill valve (not shown).

When an intermediate level of regulated pow is required, valve member 22 is moved axially upwardly in the orientation shown so as to increase the effective area of orifice 6 and place auxiliary flow orifice 10 in communication with chamber 9, as seen in FIG. 3, to provide high pressure auxiliary flow to the pump rotor bearing surfaces as indicated by arrow D. Since the auxiliary flow communicates with chamber 23 along passageway 35, the piston control chamber 25 is subject to high pressure flow via the passageway 24A causing the piston 27 to move to the right in the orientation shown and drive the pump housing 29 to a predetermined minimum discharge flow position, Under such intermediate regulated flow conditions. the engine is driving the pump at a relatively high speed, and moving the pump 28 into a minimum discharge rate condition therefore minimises the amount of spill in the direction of arrow C.

When a high-regulated flow is required, the valve member 22 is moved axially upwardly in the orientation shown to the position seen in FIG. 4. The high engine speed in this operational condition drives the pump 28 at high speed, necessitating a lubricating and cooling flow to the pump bearing surfaces 11. It will be apparent that orifice 10 communicating with chamber 9 provides the necessary high-pressure flow to the bearing surfaces 11. However, the orifice 24 feeding the passageway 35 is closed by valve member 22, preventing high pressure flow to the piston control chamber 25 and causing the pump to move into the maximum discharge position shown in FIG. 4. This enables the pump 28 to supply the necessary high rate of regulated flow via the metering valve 21 in the direction of arrow A. Spill flow in the direction of arrow C will be minimal in this condition because of the high engine flow requirement. It will be apparent that, whilst the embodiment shown in FIGS. 2 to 4 is particularly advantageous, the exemplary pump control means 23,24,25,27 could be provided independently, without the auxiliary flow port arrangement 9,10.

Figure 5:
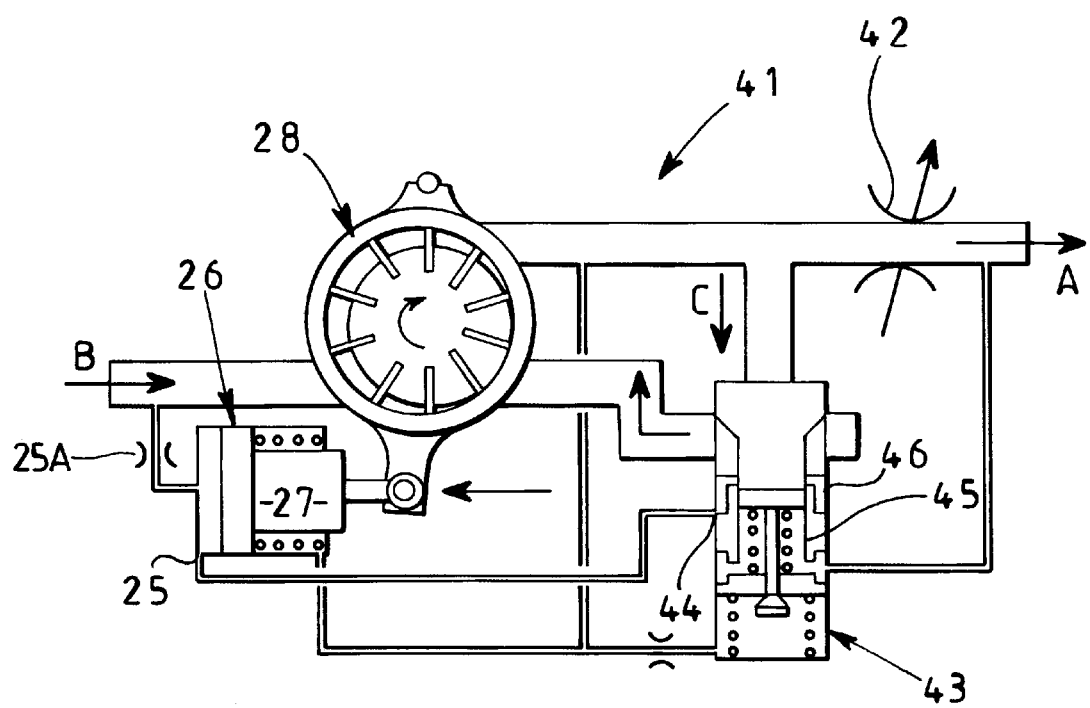
FIG. 5 is a schematic drawing showing a portion of still another fuel control system for a gas turbine engine.

FIG. 5 shows a portion of a further fuel control system 41 comprising a metering valve 42, operable to regulate a flow of fuel to supply a desired regulated flow in the direction A to a gas turbine engine. A pressure drop and spill valve 43 is connected across the metering valve 42. The system 41 also includes a variable displacement vane pump 28 and a servo device 26. Features of the system 41, which are identical to features already described with reference to FIGS. 1 and 2 to 4, are given identical reference numerals and are not described in detail again.

The piston control chamber 25 of servo device 26 is supplied from a servo flow port arrangement including an orifice 44 and a servo flow chamber 46 defined by a control element 45 of the pressure drop and spill valve 43. The arrangement is such that the effective area of the orifice 44 is continuously varied in accordance with pressure differential across the metering valve 42 by movement of the control element 45, thereby continuously varying the high pressure servo flow to the piston control chamber 25 and consequently the displacement and the discharge rate of the pump 28. At take-off/climb and relight conditions the fuel requirement of the engine approaches the maximum delivery capacity of the pump so that metering pressure drop tends to decrease. This causes spill control element 45 to move upwards reducing spill flow to a low level, in which position the element 45 cuts off high pressure servo flow to the pump thus providing maximum pump displacement. Fully variable control of the pump discharge rate can be provided under intermediate flow conditions when orifice 44 is partially open to achieve near optimum pump delivery and spill flow in accordance with the regulated flow requirement of the engine. If pump delivery exceeds the optimum value, the spill volume will increase thus spill element 45 will move downwards further opening the orifice 44 and causing the pump discharge to be reduced until the spill element and thus pump discharge returns to the optimum value.

The general pressure drop and spill valve arrangement shown in FIG. 5 is similar to that shown in EP-A1-0107940, which is incorporated herein by reference, at page 5 and FIG. 3. However, other suitable pressure drop and spill valve arrangements may alternatively be employed. as will be apparent to the skilled person.

Control of the pump displacement has a relatively slow effect on the output flow and may be inaccurate due to hysteresis in the pump variable displacement mechanism, whereas the pressure drop and spill valve quickly affects the regulated flow and provides accurate fine control, resulting in control loops with different reaction times.

The metering valve 42 can incorporate an auxiliary bearing flow arrangement as described above with reference to FIG. 1.

As described above, the pump control may select only a maximum or minimum pump output flow rate or may be able to control output rate to any value between maximum and minimum. The two position control arrangement substantially reduces pump delivery and thus heat rejection to fuel at the critical idle and cruise conditions, while the infinitely variable control arrangement seeks to achieve near optimum pump delivery and heat rejection at all operating conditions at the expense of a more complicated control arrangement.

What we claim is:

1. A fuel control system for an engine, comprising a pump operable to supply an output flow of fuel, a valve operable to regulate the output flow, and auxiliary flow control means operable to vary an auxiliary flow of fuel from the output flow according to an operational condition of the valve, wherein the auxiliary flow control means is operable to vary an auxiliary flow of fuel from the output flow to a bearing surface of the pump according to the operational condition of the valve.

2. A system as claimed in claim 1, wherein the auxiliary flow control means includes an auxiliary flow port arrangement integral with the valve for varying the auxiliary flow.

3. A system as claimed in claim 1, wherein the valve is a metering valve.

* * * * *